Patented Feb. 3, 1931

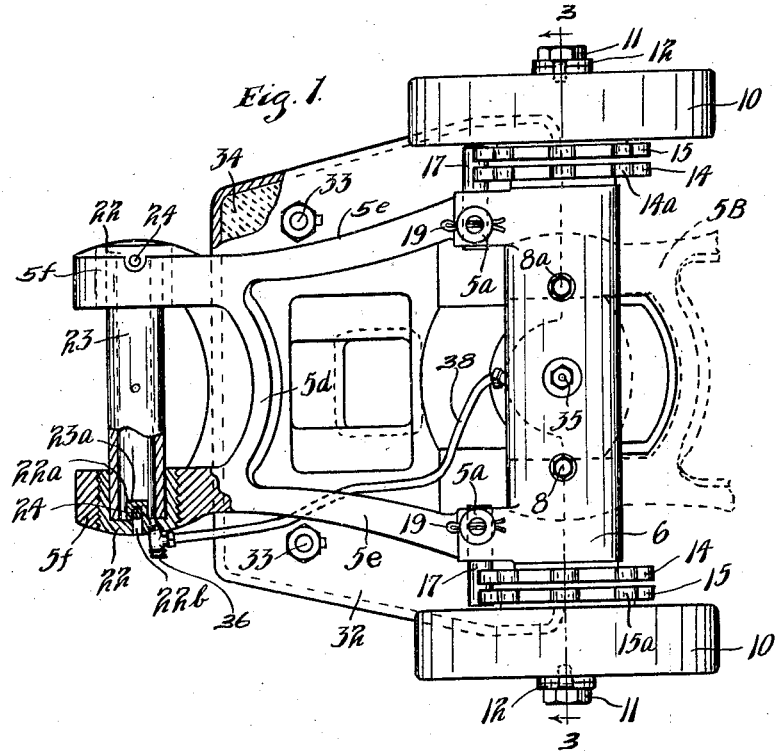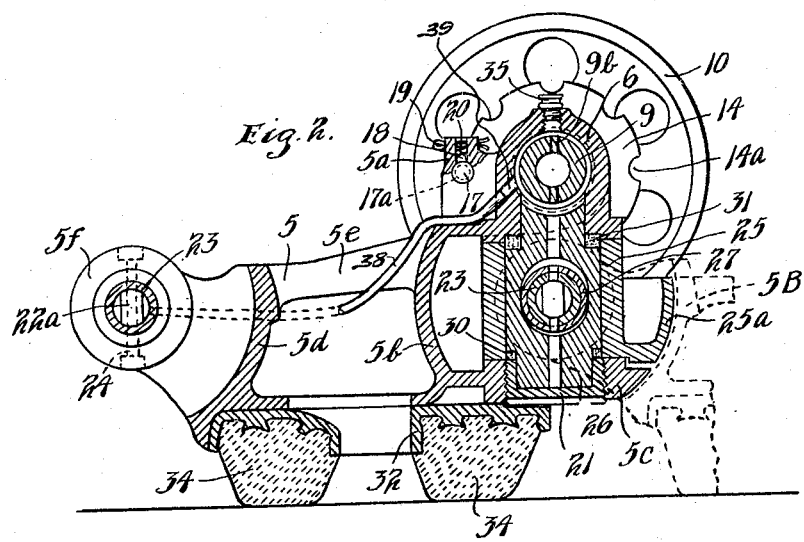

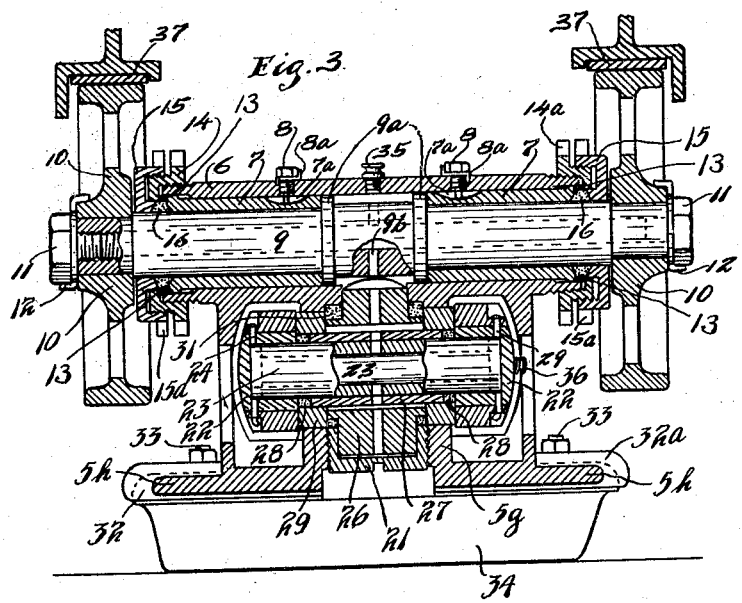

1,791,306

UNITED STATES PATENT OFFICE

ORRA L. GILLILAND, OF MINNEAPOLIS, MINNESOTA, ASSIGNOR TO GILLILAND COMPANY, OF MINNEAPOLIS, MINNESOTA, A CORPORATION OF DELAWARE

TREAD CHAIN FOR TRACTORS

Application filed August 10, 1925. Serial No. 49,249.

This invention relates to a tread chain or track for a tractor using a tread of the endless track type. In such tractors where a guiding track is used for the tread chain, particularly those in which the links of the tread have rollers bearing against the track, a great side thrust occurs at times on the bearing members of the links. It is desirable to have this thrust carried on means disposed at the interior of the link so that the links can be efficiently lubricated and a dust proof structure provided.

It is an object of this invention, therefore, to provide a link structure for a tractor tread chain comprising a link having bearing rollers thereon carried on the shaft extending through the link, thrust means being provided on said shaft engaging thrust means in the interior of the link, whereby an oil tight and dust proof structure is provided.

It is a further object of the invention to provide a tread chain comprising connected links pivotally connected about axes which intersect at right angles, one of said links comprising a pair of spaced ears carrying a pin disposed about one of said axes, said pin being hollow and carrying a novel means at its end forming an oil tight and dust proof structure, whereby oil can be carried at the interior of said link and pin.

It is still another object of the invention to provide such a link as defined in the preceding paragraph, in which a post is journaled on said pin about the other of said axes, said post being provided with a central opening aligning with an opening into said pin, whereby the parts can be efficiently lubricated.

It is more specifically an object of the invention to provide a link structure comprising a link having a transversely extending hub in which are disposed bushings spaced at their inner ends, a shaft extending through said hub and bushings having spaced collars thereon respectively abutting the inner ends of said bushings, together with adjusting means for said bushings.

It is still another object of the invention to provide a link structure as set forth in the preceding paragraph, together with stuffing means at the ends of the hub, whereby a dust proof and oil tight structure is provided, together with means for locking the stuffing means and the adjusting means at the ends of the hub in position.

These and other objects and advantages of the invention will be fully set forth in the following description made in connection with the accompanying drawings, in which like references refer to the same parts throughout the different views, and in which Fig. 1 is a top plan view of one of the links, a portion of the adjacent link being shown by dotted lines and a portion being shown in horizontal section;

Fig. 2 is a central vertical section of Fig. 1;

Fig. 3 is a vertical section on line 3—3 of Fig. 1; and

Fig. 4 is a vertical section showing a portion of Fig. 3 on an enlarged scale.

The link structure of the present invention is an improvement upon that shown in the prior patent granted to applicant January 27, 1925, numbered 1,524,298.

Referring to the drawings, a link structure is shown comprising a link 5. Said link has at one end a transverse hub 6 bored to receive a pair of bushings 7 spaced at their inner ends. In order to prevent turning of these bushings, the same are formed with slots 7a, into which extend the inner end of screws 8, said screws being prevented from turning by lock washers 8a, one side of which is bent downward to extend into a recess formed into the hub 6 and the other end of which is bent up against the flat side of the head of screw 8. A shaft 9 is journaled in the bushings 7 and is provided adjacent its central portion with spaced collars 9a, the outer sides of which abut against the inner ends of the bushings 7, said collars thus forming thrust means engaging the bushings 7 which form thrust members. The shaft 9 has reduced portions at its ends to which are secured rollers 10, said rollers being held in place by headed screws 11 threaded into the ends of shaft 9. The screws 11 are locked in place by washers 12 disposed beneath their heads having one side bent to engage a flat surface on the hubs of rollers 10 and having their opposite sides bent to engage a flat surface on the heads of screws 11. The shaft 9 is made hollow and has a plurality of openings 9b into its hollow portion between collars 9a. The bushings 7 are slightly enlarged at their outer ends, said enlarged portions being disposed in the slightly enlarged bore of hub 6. The ends of bushings 7 are engaged by a washer 13, which is, in turn, engaged at its outer side by an inwardly projecting flange of an adjusting member 14 which is threaded on the outer end of the hub 6. Member 14 is provided with an outwardly extending flange having notches 14a formed therein. The exterior portion of member 14 is threaded and receives a threaded cylindrical flange of a stuffing member 15 having a central hub portion surrounding shaft 9 and projecting into the central opening in the inner flange of member 14, a packing material 16 being inserted between the inner end of member 15 and the outer end of bushing 7. The member 15 also has an outwardly projecting flange with notches 15a formed therein. The members 14 and 15 are locked in adjusted position by pin 17 and adapted to fit in the notches 14a and 15a, said pin being received in a bore formed in a lug 5a at one side of hub 6 and having a semi-spherical recess 17a therein, in which engages a ball 18. A cotter pin 19 extends through the lug 5a and a small spring 20 is disposed between said cotter pin and ball 18, whereby said ball is resiliently held in the recess 17a and pin 17 held in position. Preferably the spring 20 will be enclosed in a cylindrical cap (not shown) fitting in the bore of lug 5a, in order to exclude dust and dirt. It will be understood that there is one of the members 13, 14 and 15 at each end of hub 6. As shown in Fig. 2, the link 5 has a web 5b at one side of and below the hub 6, which web supports a hub 5c having a vertical axis which is bored and threaded to receive a stop plug 21. The link also has a web 5d spaced from the web 5b, the outer surface of which is formed substantially on the surface of a sphere. The webs 5d and 5b are joined by side webs or ribs 5e extending from the hub 6 and lugs 5a forwardly to support a pair of spaced hubs or ears 5f. The ears 5f are bored and threaded to receive screws 22, having closed outer ends and being bored at their inner ends to receive and support a pin 23 extending between said ears. The pin 23 is hollow and has a diametral slot 23a at each end, shown as of rectangular cross section. The screws 22 have an internal rib 22a fitting into the grooves 23a, and said screws 22 each have an external diametral slot 22b which is shown as sufficiently deep to extend into rib 22a. The screws 22 are locked into position by being pinned to the ears 5f by pins 24 passing through aligned apertures in each side of said ears and through the slot 22b.

The pins 24 are headed and have one end bent so as to be locked in position.

The adjacent links of the chain are connected by a block 25, which block has a web 25a at one side with its external surface formed substantially on the surface of a sphere, which surface moves against or adjacent the external surface of web 5d. The block 25 is pivoted about a vertical axis to post 26 having a transverse bore through which extends a bushing 27 fitting the pin 23. The ends of bushing 27 are spaced from the inner ends of screws 22 and packing material 28 is disposed therebetween. Collars 29 surround the ends of bushing 27 and the packing material 28, said collars 29 fitting in bores formed in spaced ribs or webs 5g on the link 5 beneath hub 6. The lower end of post 26 is received and journaled in the stop plug 21. Said post is formed with a shoulder spaced from the end of plug 21, and packing material 30 is inserted between said head and shoulder. The upper end of post 26 is somewhat reduced and journaled in a vertical cylindrical bore formed in link 5 through the bottom of hub 6. The post 26 is formed with a shoulder at its upper end between which and an enlargement of the bore through the bottom of hub 6 is disposed packing material 31. The post 6 is provided with a central aperture extending axially therethrough and pin 23 and bushing 27 are formed with alined apertures at their opposite sides in line with said aperture through post 26. The transverse bore through the post 26 is enlarged at the top and bottom of bushing 27 to provide an oil chamber. It will thus be seen that there is an oil passage in hub 6 between collars 9a around shaft 9 into the hollow portion of shaft 9 through post 26 and into the hollow portion thereof and of pin 23.

The link 5 is provided with a bottom web 5h embraced by the flange 32a of a tread plate 32, said flanges being secured by headed and nutted bolts 33. The plate 32 has secured therein tread members 34 of hard rubber. It will be noted that the sides and ends of tread members 34 converge downwardly. A threaded aperture is formed in the top of hub 6 at its central portion and receives a closing plug 35. The end of pin 23 is also drilled and tapped to receive an oil plug 36 by means of which oil can be projected into the pin 23, which plug may be of the well known alemite type. A portion of the adjacent link connected to the link 5, shown in full lines, is also shown in dotted lines in Figs. 1 and 2 as 5B. A portion of the track on which the rollers 10 bear is also shown as 37 in Fig. 3.

It may be desirable to connect the oil chamber formed in the hub 6 of the link between collars 9a with the oil chamber formed in the shaft 23 at the other end of the link. For this purpose, an oil tube 38 is shown, one end of which is secured in a bore 39 extending downwardly substantially at forty five degrees from the center of hub 6. Said tube extends toward one of the hubs or ears 5f passing through the opening in one of the ribs 5e, said tube having its end secured in one arm of the alemite plug 36. With this structure, oil can be forced into the oil chamber shaft 23 and simultaneously forced into the oil chamber in hub 6.

From the above description, it is seen that applicant has provided a very efficient and rugged link structure for the endless tread or track of the tractor. Great thrust is often encountered by the rollers 10 in a direction endwise of shaft 9, and this end thrust is efficiently taken by the ends of bushings 7 at the interior portion of the link. The thrust thus occurs on surfaces which are lubricated and which are kept free from dust, the ends of the hub 6 being effectively closed and being oil tight and dust proof. The bushing 7 can be maintained in proper engagement with collars 9a by proper adjustment of members 14 and the ends of the hub can, likewise, be kept tightly closed by adjustment of members 15. When it is desired to adjust members 14 and 15, pin 17 will be driven endwise out of engagement with the notches 14a and 15a. Upon being returned to normal position, the pin 17 is effectively held by ball 18. It will also be seen that the bearing for post 26 is dust proof and that the described structure makes an oil tight and dust proof end for pin 23. The interior portion of the link is so well protected that, in a test made on the actual structure, one hundred and twenty-five pounds of steam were turned onto the interior of the hub and no steam escaped therefrom. The link structure has been amply tested in actual practice and subjected to very heavy duty and found to be very successful and efficient.

It will, of course, be understood, that various changes may be made in the form, details, arrangement and proportions of the parts without departing from the scope of applicant's invention, which, generally stated, consists of a device capable of carrying out the objects above set forth and in the novel parts and combinations of parts disclosed and defined in the appended claims.

What is claimed is:—

1. A link structure for a tractor tread chain having in combination a pair of rollers adapted to engage a track, a shaft to each end of which said rollers are secured, a link member having a transversely extending hub, spaced thrust means in the interior of said hub, said shaft having spaced means thereon respectively engaging said thrust means, and means on the ends of said hub for adjusting said thrust means against said means on said shaft.

2. A link structure for a tractor tread chain having in combination a pair of rollers adapted to engage a track, a shaft to each end of which said rollers are secured, a link member having a transversely extending hub, bushings in said hub having their inner ends spaced, said shaft extending through said bushings and having spaced collars thereon respectively abutting the inner ends of said bushings, and adjustable means in said link engaging the other ends of said bushings.

3. The structure set forth in claim 2, and adjustable means on the end of said hub surrounding said shaft, and packing disposed between said last mentioned means and bushings, whereby an oil tight structure is provided.

4. A link structure for a tractor tread chain having in combination a pair of rollers adapted to engage a track, a shaft to each end of which said rollers are secured, a link member having a transversely extending hub, bushings in said hub having their inner ends spaced, said shaft extending through said bushings and having spaced collars thereon respectively abutting the inner ends of said bushings, means at the ends of said hub surrounding said shaft, packing material at the outer ends of said bushings engaged by said last mentioned means, whereby said hub is made oil tight and dust proof, said shaft being hollow and having an aperture extending to its interior between said collars, and means threaded into the ends of said shaft holding said rollers thereon.

5. A link structure for a tractor tread chain having in combination a pair of rollers adapted to engage a track, a shaft to each end of which said rollers are secured, a link member having a transversely extending hub, spaced thrust members in said hub forming bearings for said shaft, spaced means on said shaft engaging the inner ends of said thrust members, adjusting members threaded on the outer ends of said hub for adjusting said thrust members, and means for locking said last mentioned means.

6. The structure set forth in claim 5, stuffing means threaded on said adjusting members and held by said locking means, whereby an oil tight and dust proof structure is formed.

7. A tractor belt for tractors comprising connected links, each having at one end a pair of spaced ears aligned on a transverse axis, a block pivoted on a vertical axis to the opposite end of the adjacent link and pivotally mounted on a transverse pin carried in said ears and extending therebetween, said pin being hollow and having a diametral slot at one end, a screw threaded into the ear at said end, said screw being bored to receive the end of said pin and having a closed end and an internal rib projecting into said slot, said screw having an external diametral slot, and a pin extending through said ear and slot to lock said screw in position, whereby an oil tight and dust proof structure is provided.

8. A link structure for a tractor tread chain having in combination, a pair of rollers adapted to engage a track, a shaft to each end of which said rollers are secured, a link member having a transversely extending hub, bushings in said hub having their inner ends spaced, said shaft extending through said bushings and having spaced collars thereon respectively abutting the inner ends of said bushings, a member threaded onto each end of said hub and having outwardly projecting teeth and a member threaded onto each of said last mentioned members and extending to said shaft and each having a flange extending into said last mentioned members, said members also having outwardly projecting teeth, packing means between said last mentioned members and the ends of said bushings and means engaging the teeth on both of said last two members for locking the same in position.

9. A link structure for a tractor tread chain having in combination a pair of rollers adapted to engage a track, a shaft to each end of which said rollers are secured, a link member having a transversely extending hub, bushings in said hub having their inner ends spaced, said shaft extending through said bushings and having spaced collars thereon respectively abutting the inner ends of said bushings, means at the ends of said hub surrounding said shaft, packing material at the outer ends of said bushings engaged by said last mentioned means, whereby said hub is made oil tight and dust proof, said shaft being hollow and having an aperture extending to its interior between said collars.

10. A tractor belt for tractors comprising connected links, each having at one end a pair of spaced ears alined on a transverse axis, a block pivoted on a vertical axis to the opposite end of the adjacent link and pivotally mounted on a transverse pin carried in said ears and extending therebetween, said pin being hollow and having a diametral slot at one end, a screw threaded into the ear at said end, said screw being adapted to embrace said pin and having a closed end and an internal rib projecting into said slot, and means for securing said screw to said ear to prevent relative rotation between said ear and screw, whereby an oil tight and dust proof structure is provided.

In testimony whereof I affix my signature.

ORRA L. GILLILAND.